Patented June 10, 1924.

1,497,477

UNITED STATES PATENT OFFICE.

LEVI HENRY BLOUCH AND JACOB HOWARD ROOP, OF PHILADELPHIA, PENNSYLVANIA, ASSIGNORS TO THE NUTROSE CO., INC., OF PHILADELPHIA, PENNSYLVANIA.

BREAD-MAKING FLOUR COMPOSITION AND PROCESS OF MAKING SAME.

No Drawing. Application filed April 23, 1921. Serial No. 463,948.

*To all whom it may concern:*

Be it known that we, LEVI HENRY BLOUCH and JACOB HOWARD ROOP, citizens of the United States, residing at Philadelphia, county of Philadelphia, and State of Pennsylvania, have invented certain new and useful Improvements in Bread-Making Flour Composition and Processes of Making Same, of which the following is a specification.

One object of our invention is to provide an improved process that will permit the use of all or the greater part of the flour obtained from the wheat berry for bread-making purposes instead of only those grades commonly known as patent flours and which were heretofore believed to be the only portion of the wheat berry suitable for use as a good bread-making flour.

Another object of our invention is to effect the more economical manufacture of leavened bread by the addition of certain substances to the dough made from the flour to produce a nutritious bread of good volume, color and texture; said added substance being useful in promoting the formation of bone in the body and preventing that disease known as rickets; said added substance also being instrumental in preventing rope in bread. In addition to this, an important saving is effected in the cost of the flour and other ingredients during said manufacture. Furthermore the process is such that to the flour is restored, in soluble form, those mineral substances removed by the present method of milling flour.

In carrying out our invention we employ as the above mentioned substances primary calcium acid phosphate—$CaH_4(PO_4)_2$ and an oxidizing salt such as potassium persulphate—$(K_2S_2O_8)$, potassium bromate—$(KBr_{.3})$, and sodium bromate $(NaBr_{.3})$; said primary calcium acid phosphate and oxidizing salt being used conjointly and in conjunction with the flour as hereinafter described and may be added thereto either in solid or liquid form.

In making our improved flour composition in accordance with our process and considering that potassium persulphate $(K_2S_2O_8)$ is used as the oxidizing salt, to every hundred pounds of flour we add and mix 2 ozs. of primary calcium acid phosphate together with 0.0143 oz. of potassium persulphate. If potassium bromate is used as the oxidizing salt then 0.01 oz. of potassium bromate and 2 ozs. primary calcium acid phosphate are added and mixed for every hundred pounds of flour, or if sodium bromate is used as the oxidizing salt then 0.01 oz. of sodium bromate and 2 ozs. primary calcium acid phosphate are added for very hundred pounds of flour.

If desired, the above mentioned substances can be used by mixing them with any ingredient entering into the dough so that they become combined in the resulting dough.

It will be understood that our invention is not limited to the specific proportions of the above mentioned substances but on the contrary are merely given as an example sufficient to carry our process into effect.

As stated in one of the objects of the invention the greater part or all of the flour obtained from the wheat berry can be used in carrying out our process and when processed as above described such flour is rendered suitable as a first class bread-making flour. In using the ingredients the amounts as specified are to be thoroughly mixed with every hundred pounds of the grade of flour as herein stated or dissolved in any ingredient used in the dough together with the other ingredients usually employed in the manufacture of leavened bread. If desired the necessary proportion of the foregoing substances such for example as the primary calcium acid phosphate and oxidizing salt may be incorporated in the flour at the time it is barreled at the mill and may be sold to the trade in that form.

We do not claim the employment of primary calcium acid phosphate and an oxidizing salt separately in the manufacture of leavened bread but have discovered that when these substances are taken together and employed with flour and particularly with such a grade of flour not usually used by the baking trade for bread-making purposes that they produce a bread-making flour composition which results in the production of excellent bread equal to or superior to bread made from a higher grade flour and our invention is therefore instrumental in effecting a considerable saving in the manufacture of bread.

Having thus described our invention, what we claim as new and desire to secure by Letters Patent is:—

1. A bread-making composition including flour mixed with less than 1% of primary calcium acid phosphate and a smaller per cent of an oxidizing salt.

2. A bread-making flour of a low commercial grade with which is admixed conjointly a small quantity of primary calcium acid phosphate and a smaller quantity of an oxidizing salt.

3. A bread making flour of a low commercial grade with which is admixed conjointly a small quantity of primary calcium acid phosphate and a smaller quantity of potassium persulphate.

4. A bread making flour of a low commercial grade with which is admixed conjointly primary calcium acid phosphate and potassium persulphate used in approximately the proportion of 100 pounds flour, 2 ozs. primary calcium acid phosphate and 0.0143 oz. potassium persulphate.

In testimony whereof we have signed our names to this specification in the presence of two subscribing witnesses.

LEVI HENRY BLOUCH.
JACOB HOWARD ROOP.

Witnesses:
ELIZABETH GARBE,
CHAS. E. POTTS.